US012684237B2

(12) United States Patent (10) Patent No.: US 12,684,237 B2
Kwon et al. (45) Date of Patent: Jul. 14, 2026

(54) METHOD AND APPARATUS WITH IMAGE PROCESSING

(71) Applicants:Samsung Electronics Co., Ltd., Suwon-si (KR); Seoul National University R&DB Foundation, Seoul (KR)

(72) Inventors: Kinam Kwon, Suwon-si (KR); Heewon Kim, Seoul (KR); Kyoung Mu Lee, Seoul (KR); Hyong Euk Lee, Suwon-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 600 days.

(21) Appl. No.: 17/982,029

(22) Filed: Nov. 7, 2022

(65) Prior Publication Data

US 2023/0153964 A1 May 18, 2023

(30) Foreign Application Priority Data

Nov. 16, 2021 (KR) ........................ 10-2021-0157501
Feb. 10, 2022 (KR) ........................ 10-2022-0017701

(51) Int. Cl.
*G06T 5/50* (2006.01)
*G06T 5/60* (2024.01)
(Continued)

(52) U.S. Cl.
CPC ............. *H04N 23/682* (2023.01); *G06T 5/50* (2013.01); *G06T 5/60* (2024.01); *G06T 5/70* (2024.01);
(Continued)

(58) Field of Classification Search
CPC .... G06T 5/92; G06T 5/77; G06T 5/60; G06T 5/73; G06T 5/70; G06T 5/50;
(Continued)

(56) References Cited

U.S. PATENT DOCUMENTS 5,563,720 A 10/1996 Edgar et al.
9,591,195 B2 3/2017 Nikkanen et al.
(Continued)

FOREIGN PATENT DOCUMENTS

CN 114792387 A 7/2022
KR 10-2017-0065985 A 6/2017
(Continued)

OTHER PUBLICATIONS

Kim W, Nguyen AD, Kim J, Kim J, Oh H, Lee S. Diverse and adjustable versatile image enhancer. IEEE Access. May 27, 2021; 9: 80883-96. (Year: 2021).*
(Continued)

*Primary Examiner* — Tracy Mangialaschi
(74) *Attorney, Agent, or Firm* — NSIP Law

(57) ABSTRACT

A processor-implemented method with image processing includes: providing retouch result candidates of an input image to a user in response to applying vector value candidates to a style vector, determining a vector value of the style vector based on a selection of the user for the retouch result candidates; determining an adjustment parameter set corresponding to the determined vector value of the style vector, and generating a retouch result by adjusting the input image based on the adjustment parameter set.

24 Claims, 10 Drawing Sheets

(51) Int. Cl.
| | |
|---|---|
| *G06T 5/70* | (2024.01) |
| *G06T 5/73* | (2024.01) |
| *G06T 5/77* | (2024.01) |
| *G06T 5/92* | (2024.01) |
| *H04N 23/68* | (2023.01) |

(52) U.S. Cl.
CPC .................. *G06T 5/73* (2024.01); *G06T 5/77* (2024.01); *G06T 5/92* (2024.01); *G06T 2200/24* (2013.01); *G06T 2207/20081* (2013.01); *G06T 2207/20084* (2013.01)

(58) Field of Classification Search
CPC ....... G06T 2200/24; G06T 2207/20081; G06T 2207/20092; G06T 2207/20084; H04N 23/682; H04N 23/81; H04N 23/617; H04N 23/82; H04N 23/76; H04N 23/88
See application file for complete search history.

(56) References Cited

U.S. PATENT DOCUMENTS

| | | | |
|---|---|---|---|
| 10,929,646 | B2 | 2/2021 | Wang |
| 2018/0211369 | A1 | 7/2018 | Leleannec et al. |
| 2020/0051217 | A1 | 2/2020 | Shen et al. |
| 2021/0014410 | A1 | 1/2021 | Schroer et al. |

FOREIGN PATENT DOCUMENTS

| | | |
|---|---|---|
| KR | 10-2017-0078516 A | 7/2017 |
| KR | 10-2020-0134374 A | 12/2020 |
| KR | 10-2021-0063231 A | 6/2021 |
| KR | 10-2021-0099456 A | 8/2021 |

OTHER PUBLICATIONS

Du, Xiaoyu, et al. "Progressive image enhancement under aesthetic guidance." Proceedings of the 2019 on International Conference on Multimedia Retrieval. 2019. (Year: 2019).*

Kang, Sing Bing, Ashish Kapoor, and Dani Lischinski. "Personalization of image enhancement." 2010 IEEE Computer Society Conference on Computer Vision and Pattern Recognition. IEEE, 2010. (Year: 2010).*

Marks, J., et al. "Design Galleries: A General Approach to Setting Parameters for Computer Graphics and Animation." Proc. SIGGRAPH97. ACM SIGGRAPH, (1997). (Year: 1997).*

Kim, Han-Ul, Young Jun Koh, and Chang-Su Kim. "PieNet: Personalized image enhancement network." European conference on computer vision. Cham: Springer International Publishing, 2020. (Year: 2020).*

Bychkovsky, Vladimir, et al. "Learning photographic global tonal adjustment with a database of input/output image pairs." CVPR 2011. IEEE, Aug. 22, 2011. pp. 96-104.

Caicedo, Juan C., Ashish Kapoor, and Sing Bing Kang. "Collaborative personalization of image enhancement." CVPR 2011. IEEE, Aug. 22, 2011. pp. 249-256.

Chen, Yu-Sheng, et al. "Deep photo enhancer: Unpaired learning for image enhancement from photographs with gans." Proceedings of the IEEE Conference on Computer Vision and Pattern Recognition. 2018. pp. 6306-6314.

Gharbi, Michaël, et al. "Deep bilateral learning for real-time image enhancement." ACM Transactions on Graphics (TOG) vol. 36, Issue 4 (Aug. 22, 2017): pp. 1-12.

He, Jingwen, et al. "Modulating image restoration with continual levels via adaptive feature modification layers." Proceedings of the IEEE/CVF Conference on Computer Vision and Pattern Recognition. 2019. pp. 11056-11064.

He, Jingwen, et al. "Interactive multi-dimension modulation with dynamic controllable residual learning for image restoration." European Conference on Computer Vision. Springer, Cham, Sep. 22, 2020. pp. 1-16.

He, Jingwen, et al. "Conditional sequential modulation for efficient global image retouching." European Conference on Computer Vision. Springer, Cham, Sep. 22, 2020. pp. 1-16.

Hsu, Eugene, et al. "Light mixture estimation for spatially varying white balance." ACM SIGGRAPH 2008 papers. Aug. 2008. 1-7.

Hu, Yuanming, et al. "Exposure: A white-box photo post-processing framework." ACM Transactions on Graphics (TOG) vol. 37 Issue 2 (Feb. 6, 2018): pp. 1-23.

Huang, Shih-Chia, et al. "Efficient contrast enhancement using adaptive gamma correction with weighting distribution." IEEE transactions on image processing vol. 22 Issue 3 (Oct. 22, 2012): pp. 1-29.

Hwang, Sung Ju, et al. "Context-based automatic local image enhancement." European conference on computer vision. Springer, Berlin, Heidelberg, 2012. pp. 569-582.

Ignatov, Andrey, et al. "Dslr-quality photos on mobile devices with deep convolutional networks." Proceedings of the IEEE International Conference on Computer Vision. 2017. pp. 3277-3285.

Isola, Phillip, et al. "Image-to-image translation with conditional adversarial networks." Proceedings of the IEEE conference on computer vision and pattern recognition. 2017. pp. 1125-1134.

Joshi, Neel, et al. "Personal photo enhancement using example images." ACM Trans. Graph. vol. 29 Issue 2 (Mar. 2010): pp. 1-15.

Kang, Sing Bing, et al. "Personalization of image enhancement." 2010 IEEE Computer Society Conference on Computer Vision and Pattern Recognition. IEEE, Aug. 5, 2010. pp. 1-8.

Kim, Heewon, et al. "Searching for Controllable Image Restoration Networks." Proceedings of the IEEE/CVF International Conference on Computer Vision. 2021. pp. 14234-14243.

Kim, Han-Ul, et al. "PieNet: Personalized image enhancement network." European Conference on Computer Vision. Springer, Cham, Sep. 24, 2020. pp. 1-17.

Kingma, Diederik P. et al. "Adam: A method for stochastic optimization." arXiv preprint arXiv:1412.6980 (Jan. 30, 2014). pp. 1-15.

Land, Edwin H. et al. "Lightness and retinex theory." Josa vol. 61 Issue 1 (Jan. 1971): pp. 1-11.

Liang, Jie, et al. "High-resolution photorealistic image translation in real-time: A laplacian pyramid translation network." Proceedings of the IEEE/CVF Conference on Computer Vision and Pattern Recognition. 2021. pp. 9392-9400.

Lischinski, Dani, et al. "Interactive local adjustment of tonal values." ACM Transactions on Graphics (TOG) vol. 25 Issue 3 (Jul. 2006): pp. 1-8.

Moran, Sean, et al. "Deeplpf: Deep local parametric filters for image enhancement." Proceedings of the IEEE/CVF conference on computer vision and pattern recognition. 2020. pp. 12826-12835.

Park, Jongchan, et al. "Distort-and-recover: Color enhancement using deep reinforcement learning." Proceedings of the IEEE conference on computer vision and pattern recognition. 2018. pp. 5928-5936.

Pizer, Stephen M., et al. "Adaptive histogram equalization and its variations." Computer vision, graphics, and image processing vol. 39 Issue 3 (Sep. 1987): pp. 355-368.

Ramanath, Rajeev, et al. "Color image processing pipeline." IEEE Signal Processing Magazine vol. 22 Issue 1 (Jan. 2005): pp. 1-20.

Wang, Ruixing, et al. "Underexposed photo enhancement using deep illumination estimation." Proceedings of the IEEE/CVF Conference on Computer Vision and Pattern Recognition. 2019. pp. 6849-6857.

Wang, Tao, et al. "Real-time image enhancer via learnable spatial-aware 3d lookup tables." Proceedings of the IEEE/CVF International Conference on Computer Vision. 2021. pp. 2471-2480.

Wang, Xintao, et al. "Deep network interpolation for continuous imagery effect transition." Proceedings of the IEEE/CVF Conference on Computer Vision and Pattern Recognition. 2019. pp. 1692-1701.

Xiao, Bin, et al. "Brightness and contrast controllable image enhancement based on histogram specification." Neurocomputing vol. 275 (Jan. 31, 2018): pp. 2798-2809.

Yan, Jianzhou, et al. "A learning-to-rank approach for image color enhancement." Proceedings of the IEEE Conference on Computer Vision and Pattern Recognition. 2014. pp. 1-8.

(56)         References Cited

OTHER PUBLICATIONS

Zeng, Hui, et al. "Learning image-adaptive 3d lookup tables for high performance photo enhancement in real-time." *IEEE Transactions on Pattern Analysis and Machine Intelligence* (Sep. 30, 2020). pp. 1-16.

Du, Xiaoyu, et al. "Progressive Image Enhancement Under Aesthetic Guidance." Proceedings of the 2019 on International Conference on Multimedia Retrieval. 2019, (5 pages in English).

Kim, Woojae, et al. "Diverse and Adjustable Versatile Image Enhancer." IEEE Access 9 (2021): 80883-80896.

Kim, Heewon, et al. "Controllable Image Enhancement." arXiv preprint arXiv:2206.08488 (2022), (23 pages in English).

Extended European search report issued on Apr. 4, 2023, in counterpart European Patent Application No. 22207450.2 (8 pages in English).

European Office Action Issued on Apr. 2, 2025, in Counterpart European Patent Application No. 22207450.2 (7 Pages in English).

* cited by examiner

FIG. 3

METHOD AND APPARATUS WITH IMAGE PROCESSING

CROSS-REFERENCE TO RELATED APPLICATIONS

This application claims the benefit under 35 USC § 119(a) of Korean Patent Application No. 10-2021-0157501, filed on Nov. 16, 2021, and Korean Patent Application No. 10-2022-0017701, filed on Feb. 10, 2022, in the Korean Intellectual Property Office, the entire disclosures of which are incorporated herein by reference for all purposes.

BACKGROUND

1. Field

The following description relates to a method and apparatus with image processing.

2. Description of Related Art

Image enhancement may correspond to an operation performed to enhance an original image according to a purpose. Image restoration may correspond to an operation of restoring an image in a deteriorated state so as to be improved in quality. For the image enhancement and image restoration, a deep learning-based neural network may be used. The neural network may be trained based on deep learning and map input data and output data in a non-linear relationship, thereby performing an inference according to a purpose. Such an ability to generate the mapping, which may be obtained through the training, may be a learning ability of the neural network. In addition, the neural network trained for a specialized purpose, such as the image restoration, may have a normalization ability to generate a relatively accurate output for an untrained input pattern, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In another general aspect, a processor-implemented method with image processing includes: providing retouch result candidates of an input image to a user in response to applying vector value candidates to a style vector; determining a vector value of the style vector based on a selection of the user for the retouch result candidates; determining an adjustment parameter set corresponding to the determined vector value of the style vector; and generating a retouch result by adjusting the input image based on the adjustment parameter set.

The style vector may specify a vector value of each dimension of m-dimensions.

The m-dimensions is three-dimensions.

The providing of the retouch result candidates of the input image to the user and the determining of the vector value of the style vector in based on the selection of the user may include: providing first retouch result candidates to the user in response to changing vector value candidates of an m1-dimension of the m-dimension; determining a vector value of the m1-dimension of the style vector based on a first selection of the user for the first retouch result candidates; providing second retouch result candidates to the user in response to changing vector value candidates of an m2-dimension of the m-dimension; and determining a vector value of the m2-dimension of the style vector based on a second selection of the user for the second retouch result candidates.

In the providing of the first retouch result candidates to the user in response to changing the vector value candidates of the m1-dimension, vector value candidates of remaining dimensions other than the m1-dimension in the m-dimension are fixed.

In the providing of the first retouch result candidates to the user and the providing of the second retouch result candidates to the user, the vector value candidates of the m1-dimension and the vector value candidates of the m2-dimension are changed under a control of the user.

The providing of the first retouch result candidates to the user may include: determining a candidate adjustment parameter set corresponding to a vector value candidate of the m1-dimension based on the changing; and generating a candidate retouch result by adjusting the input image based on the candidate adjustment parameter set.

The determining of the adjustment parameter set may include determining the adjustment parameter set using a decoding model based on deep learning.

The decoding model is trained through an encoder-decoder framework.

The decoding model is trained through operations of: inputting a sample input image and a sample retouch image to an encoding model based on a neural network; inputting an output of the encoding model corresponding to a sample style vector to the decoding model; inputting an output of the decoding model corresponding to a sample adjustment parameter set to an image adjustment model; acquiring an output of the image adjustment model corresponding to a sample retouch result; and training the encoding model and the decoding model such that a difference between the sample retouch image and the sample retouch result is reduced.

The adjustment parameter set may include a parameter that adjusts any one or any combination of any two or more of a digital gain, a white balance, a color correction, a gamma correction, tone mapping, denoising, and deblurring.

The generating of the retouch result may include generating the retouch result by applying the adjustment parameter set to an image signal processing (ISP) pipeline set in advance.

The ISP pipeline implements any one or any combination of any two or more of: a first adjustment function to adjust a digital gain; a second adjustment function to adjust a white balance; a third adjustment function to perform a color correction; a fourth adjustment function to perform a gamma correction; a fifth adjustment function to perform tone mapping; a sixth adjustment function to perform denoising; and a seventh adjustment function to perform deblurring.

The adjustment parameter set may include an input value of any one or any combination of any two or more of the first adjustment function, the second adjustment function, the third adjustment function, the fourth adjustment function, the fifth adjustment function, the sixth adjustment function, and the seventh adjustment function.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with image processing includes: one or more processors configured to: provide retouch result candidates of an input image to a user in response to applying vector value candidates to a style vector; determine a vector value of the style vector based on a selection of the user for the retouch result candidates; determine an adjustment parameter set corresponding to the determined vector value of the style vector; and generate a retouch result by adjusting the input image based on the adjustment parameter set.

The style vector may specify a vector value of each dimension of m-dimensions.

For the providing of the retouch result candidates and the determining of the vector value, the one or more processors may be configured to: provide first retouch result candidates to the user in response to changing vector value candidates of an m1-dimension of the m-dimension; determine a vector value of the m1-dimension of the style vector based on a first selection of the user for the first retouch result candidates; provide second retouch result candidates to the user in response to changing vector value candidates of an m2-dimension of the m-dimension; and determine a vector value of the m2-dimension of the style vector based on a second selection of the user for the second retouch result candidates.

In the providing of the first retouch result candidates to the user and the providing of the second retouch result candidates to the user, the vector value candidates of the m1-dimension and the vector value candidates of the m2-dimension are changed under a control of the user.

The apparatus may include a memory storing instructions that, when executed by the one or more processors, configure the one or more processors to perform the providing of the retouch result candidates, the determining of the vector value, the determining of the adjustment parameter set, and the generating of the retouch result.

In another general aspect, an electronic apparatus includes: a camera configured to generate an input image; and one or more processors configured to: provide retouch result candidates of the input image to a user in response to applying vector value candidates to a style vector; determine a vector value of the style vector based on a selection of the user for the retouch result candidates; determine an adjustment parameter set corresponding to the determined vector value of the style vector; and generate a retouch result by adjusting the input image based on the adjustment parameter set.

The style vector may specify a vector value of each dimension of m-dimensions.

For the providing of the retouch result candidates and the determining of the vector value, the one or more processors may be configured to: provide first retouch result candidates to the user in response to changing vector value candidates of an m1-dimension of the m-dimension; determine a vector value of the m1-dimension of the style vector based on a first selection of the user for the first retouch result candidates; provide second retouch result candidates to the user in response to changing vector value candidates of an m2-dimension of the m-dimension; and determine a vector value of the m2-dimension of the style vector based on a second selection of the user for the second retouch result candidates.

In another general aspect, a processor-implemented method with image processing method: generating retouch result candidates of an input image in response to applying vector value candidates to a style vector; determining a style vector based on the retouch result candidates; determining an adjustment parameter set corresponding to the determined vector value of the style vector; and generating a retouch result by adjusting the input image based on the adjustment parameter set.

The determining of the style vector may include determining a vector value of the style vector.

The generating of the retouch result candidates and the determining of the vector value may include: generating a first retouch result candidate in response to generating a vector value candidate of a first dimension; and determining a vector value of the first dimension of the style vector based on the first retouch result candidate.

Other features and aspects will be apparent from the following detailed description, the drawings, and the claims.

BRIEF DESCRIPTION OF THE DRAWINGS

FIG. 3 illustrates an example of an effect of a style vector.

Figure 1:
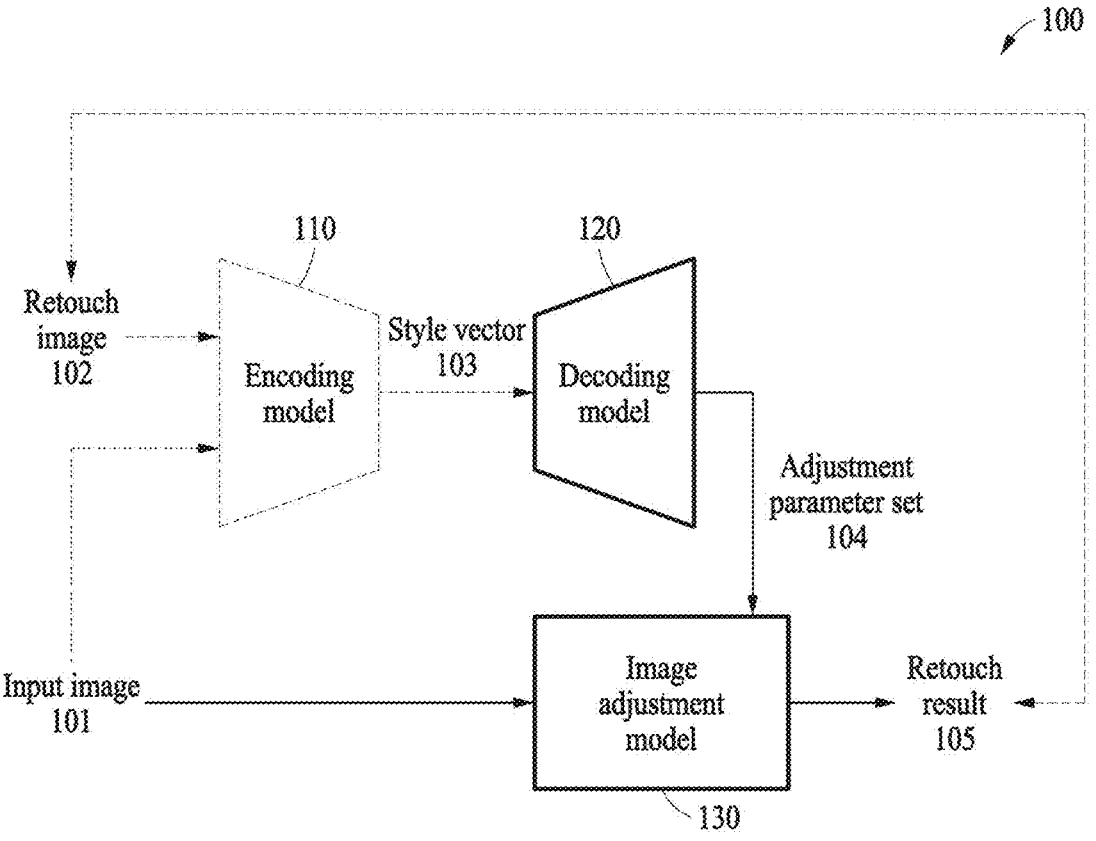
FIG. 1 illustrates an example of a process of training a retouch model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms, such as "first," "second," or "third" may be used to explain various components, members, regions, layers, or sections, these components, members, regions, layers, or sections are not to be limited by these terms. Rather, these terms should be used only to distinguish one component, member, region, layer, or section from another component, member, region, layer, or section. For example, a "first" component, member, region, layer, or section referred to in the examples described herein may also be referred to as a "second" component, member, region, layer, or section without departing from the teachings of the examples.

Throughout the specification, when a component is described as being "connected to," "coupled to," or "joined" another component, it may be directly "connected to," "coupled to," or "joined" the other component, or there may be one or more other components intervening therebetween. In contrast, when an element is described as being "directly connected to," or "directly coupled to," or "directly joined" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a", "an", and "the" are intended to include the plural forms as well, unless the context clearly indicates otherwise. The term "and/or" includes any one and any combination of any two or more of the associated listed items. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical or scientific terms used herein have the same meaning as commonly understood by one of ordinary skill in the art to which examples belong and based on an understanding of the disclosure of the present application. It will be further understood that terms, such as those defined in commonly-used dictionaries, should be interpreted as having a meaning that is consistent with their meaning in the context of the relevant art and the disclosure of the present application, and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

FIG. 1 illustrates an example of a process of training a retouch model. Referring to FIG. 1, a retouch model 100 may include an encoding model 110, a decoding model 120, and an image adjustment model 130. The retouch model 100 may output a retouch result 105 in accordance with an input of an input image 101 and a retouch image 102. The retouch model 100 may be trained to derive the retouch result 105 corresponding to the retouch image 102 from the input image 101.

An image retouch may include an image enhancement and/or an image restoration. The image enhancement may correspond to an operation of enhancing an original image according to a purpose (e.g., brightening an image). The image restoration may correspond to an operation of restoring an image in a deteriorated state into an image of improved quality.

The encoding model 110 may output a style vector 103 in response to the input image 101 and the retouch image 102 being input. The encoding model 110 may learn a retouch technique between the input image 101 and the retouch image 102 and express the retouch technique as the style vector 103. The decoding model 120 may output an adjustment parameter set 104 in accordance with an input of the style vector 103.

The encoding model 110 and the decoding model 120 may configure a neural network-based encoder-decoder framework. A neural network model may include a deep neural network (DNN) including a plurality of layers. The plurality of layers may include an input layer, at least one hidden layer (e.g., one or more hidden layers), and an output layer.

The deep neural network may include any one or any combination of any two or more of a fully connected network (FCN), a convolutional neural network (CNN), and a recurrent neural network (RNN). For example, at least a portion of the layers in the neural network may correspond to the CNN, and another portion of the layers may correspond to the FCN. In an example, the CNN may be referred to as a convolutional layer, and the FCN may be referred to as a fully connected layer.

As for the CNN, data input to each layer of the CNN may be referred to as an input feature map, and data output from each layer may be referred to as an output feature map. The input feature map and the output feature map may also be referred to as activation data. When the convolutional layer corresponds to the input layer, the input feature map of the input layer may be an input image.

When the neural network is trained based on the deep learning, the neural network may map input data and output data in a non-linear relationship with each other, thereby performing inference according to a purpose of the training. The deep learning may be a machine learning scheme for solving an issue such as image or voice recognition from a big data set. The deep learning may be understood as a process of solving an optimization issue to find a point at which energy is minimized while training a neural network based on prepared training data.

Through supervised or unsupervised learning of the deep learning, a structure of the neural network or a weight corresponding to a model may be obtained, and input data and output data may be mapped to each other through the weight. For example, when a width and a depth of the neural network are sufficiently large, the neural network may have a capacity large enough to implement an arbitrary function. When the neural network is trained on a sufficiently large quantity of training data through an appropriate training process, an optimal performance may be achieved.

In the following description, the neural network may be expressed as being "pre-trained", where "pre-" may indicate a state before the neural network is "started." The "started" neural network may indicate that the neural network is ready for inference. For example, "start" of the neural network may include loading of the neural network in a memory, and/or an input of input data for inference to the neural network when the neural network is loaded in a memory. The encoding model 110 may include a CNN and a FCN, and the decoding model 120 may include a FCN.

The image adjustment model 130 may output the retouch result 105 in accordance with an input of the input image 101 and the adjustment parameter set 104. The image adjustment model 130 may adjust pixel values of the input image 101 based on the adjustment parameter set 104. In an example, the image adjustment model 130 may be a neural network model. In this example, the image adjustment model 130 may be trained to derive the retouch result 105 from the input image 101 and the adjustment parameter set 104. In another example, the image adjustment model 130 may correspond to an image signal processing (ISP) pipeline. The ISP pipeline may be previously set to adjust any one or any combination of any two or more of a digital gain, a white balance, a color correction, a gamma correction, tone mapping, denoising, and deblurring based on the adjustment parameter set 104. At least a portion of the ISP pipeline may be configured as a hardware module and/or a combination of a hardware module implementing a software module.

The retouch model 100 may be trained such that a difference between the retouch image 102 and the retouch result 105 is reduced. In an example, a loss function corresponding to the difference between the retouch image 102 and the retouch result 105 may be defined. In this example, the retouch model 100 may be trained such that a function value of the loss function decreases. In a training process, a neural network element of the retouch model 100 may be trained. For example, in the training process, the encoding model 110 and/or the decoding model 120 may be trained. In addition, when the image adjustment model 130 corresponds to a neural network model, the image adjustment model 130 may also be trained in the training process.

To avoid confusion between the training process and an inference process, the input image 101, the retouch image 102, the style vector 103, the adjustment parameter set 104, and the retouch result 105 used in the training process may be respectively referred to as a sample input image, a sample retouch image, a sample style vector, a sample adjustment parameter set, and a sample retouch result. A neural network element (e.g., the encoding model 110 and/or the decoding model 120) of the retouch model 100 may be trained through operations of inputting the sample input image and the sample retouch image to the encoding model 110 based on the neural network, inputting an output of the encoding model 110 corresponding to the sample style vector to the decoding model 120, inputting an output of the decoding model 120 corresponding to the sample adjustment parameter set to the image adjustment model 130, acquiring an output of the image adjustment model 130 corresponding to the sample retouch result, and training the neural network element (e.g., the encoding model 110 and/or the decoding model 120) such that a difference between the sample retouch image and the sample retouch result is reduced. In the training process, numerous training image pairs, each including a sample input image and a sample retouch image, may be used as training data. For the sample retouch images, various retouch effects may be applied. For example, sample retouch images may be derived through retouching by an expert. When the training of the retouch model 100 is completed (e.g., when a difference between the sample retouch image and the sample retouch result is less than or equal to a threshold), an inference operation may be performed while the encoding model 110 is excluded.

The style vector 103 may have an m-dimensional size. An m-dimension may correspond to a limited size (e.g., 3-dimension), and the encoding model 110 may reflect a retouch technique of the retouch image 102 in the style vector 103 of the limited size. According to this setting, retouch techniques of retouch images may be imitated in the retouch result 105 by simply adjusting vector values of the style vector 103 of the limited size. In other words, a user may obtain the retouch result 105 that suits a preference of the user by simply adjusting the style vector 103 instead of adjusting numerous image effects one by one.

Like the style vector 103, the adjustment parameter set 104 may include a limited number of parameters. Limiting the number of parameters may advantageously reduce computing resources used to generate the retouch result 105 by applying the style vector 103 to the input image 101. In addition, any or all of operations of the image adjustment model 130 may be implemented by a hardware module. The hardware module may operate as a hardware accelerator. Limiting the number of parameters and/or using a hardware module may advantageously increase a speed at which the retouch result 105 according to the vector value of the style vector 103 is derived.

The image adjustment model 130 may correspond to an ISP pipeline. At least a portion or all of the ISP pipeline may be configured as a hardware module and/or a combination of a hardware module implementing a software module. The ISP pipeline may implement any one or any combination of any two or more of a first adjustment function to adjust a digital gain, a second adjustment function to adjust a white balance, a third adjustment function to perform a color correction, a fourth adjustment function to perform a gamma correction, a fifth adjustment function to perform tone mapping, a sixth adjustment function to perform denoising, and a seventh adjustment function to perform deblurring. The adjustment parameter set 104 may include input values of any one or any combination of any two or more of the first adjustment function, the second adjustment function, the third adjustment function, the fourth adjustment function, the fifth adjustment function, the sixth adjustment function, and the seventh adjustment function.

Figure 2:
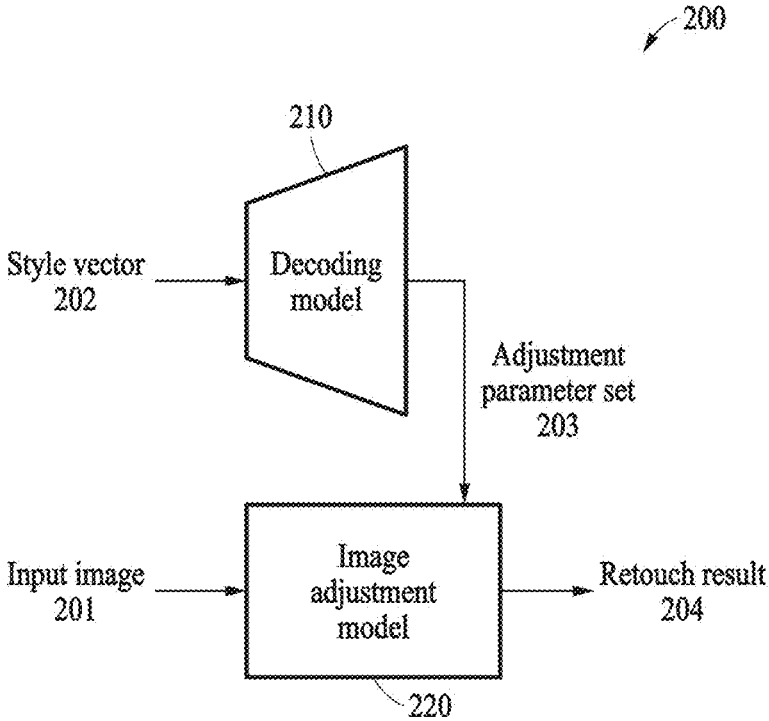
FIG. 2 illustrates an example of an inference operation of a retouch model.

FIG. 2 illustrates an example of an inference operation of a retouch model. Referring to FIG. 2, a retouch model 200 may include a decoding model 210 and an image adjustment model 220. The retouch model 200 may output a retouch result 204 in accordance with an input of an input image 201 and a style vector 202. The decoding model 210 may output an adjustment parameter set 203 in accordance with an input of the style vector 202. The image adjustment model 220 may output the retouch result 204 in accordance with an input of the input image 201 and the adjustment parameter set 203. When the training of the retouch model 100 of FIG. 1 is completed, the retouch model 200 may be derived. When the training of the retouch model 100 is completed, the encoding model 110 may be removed from the retouch model 100 to derive the retouch model 200. The decoding model 210 and the image adjustment model 220 may correspond to the decoding model 120 and the image adjustment model 130 of the retouch model 100 for which the training is completed.

When the style vectors 202 of different vector values are applied to the same input image 201, the different retouch results 204 may be generated. For example, a first retouch result of the retouch results 204 may be generated by a first vector value of the style vectors 202, and a second retouch result of the retouch results 204 may be generated by a second vector value of the style vectors 202. A user may identify retouch result candidates according to different vector value candidates of the style vectors 202, and select the retouch result 204 suitable for a preference of the user from the retouch result candidates.

A vector value of the style vectors 202 may be adjusted by the user and/or an image processing apparatus (e.g., an image processing apparatus 1000). As an example, the user may adjust a vector value through a user interface, such that retouch result candidates corresponding to vector value candidates according to the adjustment of the vector value may be provided to the user. As another example, the image processing apparatus may determine vector value candidates itself and provide retouch result candidates corresponding to the vector value candidates to the user. The image processing apparatus may arbitrarily set vector value candidates or may set vector value candidates based on a history of user preference.

Figure 3:
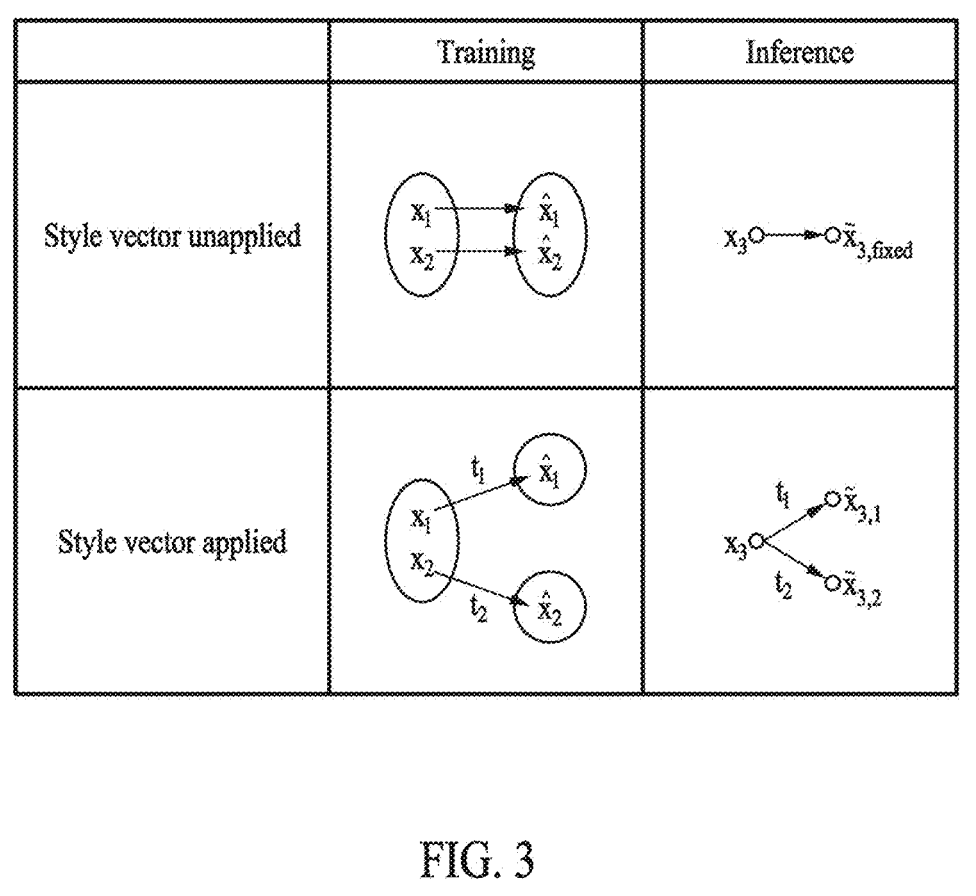

FIG. 3 illustrates an example of an effect of a style vector. In FIG. 3, x denotes an input image, $\hat{x}$ denotes a retouch image, $\tilde{x}$ denotes a retouch result, and t denotes a style vector. The retouch model may output $\hat{x}$ in accordance with an input of x and $\tilde{x}$. The retouch model may be trained such that a difference between $\tilde{x}$ and $\hat{x}$ is reduced. A retouch model (e.g., the retouch model 100 and/or the retouch model 200) may use a style vector (e.g., the style vector 103 and/or the style vector 202). When the retouch model uses the style vector, a retouch result dependent on the vector value of the style vector may be derived.

FIG. 3 illustrates a case in which a style vector is applied and a case in which a style vector is not applied.

When the style vector is not applied, a first model may be trained to derive $\tilde{x}_1$ from $x_1$ and derive $\tilde{x}_2$ from $x_2$ in a training process. When the first model is trained to derive from $x_1$ and derive $\tilde{x}_2$ from $x_2$, the first model may derive $\hat{x}_3$, fixed from $x_3$ in an inference process. The first model may not generate a different retouch result from the same input image.

When the style vector is applied, a second model may be trained to derive $\tilde{x}_1$ from $x_1$ and $t_1$ and derive $\tilde{x}_2$ from $x_2$ and $t_2$ in the training process. When the second model is trained to derive $\tilde{x}_1$ from $x_1$ and $t_1$ and derive $\tilde{x}_2$ from $x_2$ and $t_2$, the second model may derive $\hat{x}_{3,1}$ from $x_3$ and $t_1$ and derive $\hat{x}_{3,2}$ from $x_3$ and $t_2$ in the inference process. Accordingly, when different style vectors (e.g., $t_1$ and $t_2$) are used, the second model may generate different retouch results (e.g., $\hat{x}_{3,1}$ and $\hat{x}_{3,1}$) from the same input image (e.g., $x_3$). The retouch model (e.g., the retouch model 100 and/or the retouch model 200) may correspond to the second model.

Figure 4:
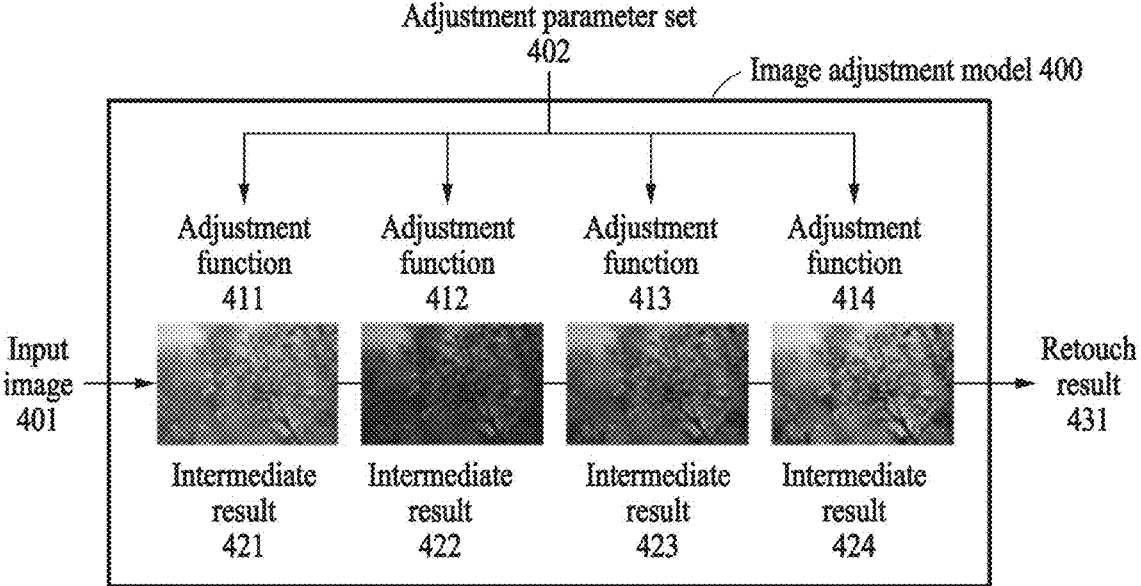
FIG. 4 illustrates an example of a process of applying an adjustment parameter set to an input image.

FIG. 4 illustrates an example of a process of applying an adjustment parameter set to an input image. Referring to FIG. 4, an image adjustment model 400 may adjust an input image 401 using an adjustment parameter set 402 and generate a retouch result 431. Prior to application of the adjustment parameter set 402, pre-processing for the input image 401 may be performed. For example, the pre-processing of the input image 401 may include demosaicing.

The image adjustment model 400 may adjust the input image 401 using adjustment functions 411 through 414. The adjustment functions 411 through 414 may include at any one or any combination of any two or more of a first adjustment function to adjust a digital gain, a second adjustment function to adjust a white balance, a third adjustment function to perform a color correction, a fourth adjustment function to perform a gamma correction, a fifth adjustment function to perform tone mapping, a sixth adjustment function to perform denoising, and a seventh adjustment function to perform deblurring. The adjustment parameter set 402 may include input values of the adjustment functions 411 through 414. The adjustment parameter set 402 may include parameters that adjust any one or any combination of any two or more of the digital gain, the white balance, the color correction, the gamma correction, the tone mapping, the denoising, and the deblurring.

The image adjustment model 400 may correspond to an ISP pipeline. The ISP pipeline may be represented as shown in Equation 1 below, for example.

$$ISP(x; \phi) = \begin{cases} ISP(x; g(f(x, \hat{x})) & \text{if training} \\ ISP(x; g(t)) & \text{if testing} \end{cases}$$

In Equation 1, ISP denotes the ISP pipeline, x denotes the input image 401, $\varphi$ denotes the adjustment parameter set 402, f denotes an encoding model, g denotes a decoding model, $\tilde{x}$ denotes a retouch image, and t denotes a style vector.

The first adjustment function through the fifth adjustment function may be respectively represented as shown in Equations 2 through 6 below, for example.

$$gain(x; \phi) = \phi_{dg} \cdot x \qquad \text{Equation 2:}$$

In Equation 2, gain denotes the first adjustment function to adjust the digital gain, and dog denotes an adjustment parameter of the digital gain.

$$WB\left(\begin{bmatrix} x_r \\ x_g \\ x_b \end{bmatrix}; \phi\right) = \begin{bmatrix} \phi_r \cdot x_r \\ x_g \\ \phi_b \cdot x_b \end{bmatrix}$$

In Equation 3, WB denotes the second adjustment function to adjust the white balance, and $x_r$, $x_g$, and $x_b$ respectively denote a red channel, a green channel, and a blue channel of the input image 401. $\varphi_r$ and $\varphi_b$ denote white balance adjustment parameters respectively for the red channel and the blue channel.

$$CCM\left(\begin{bmatrix} x_r \\ x_g \\ x_b \end{bmatrix}; \phi\right) = \begin{bmatrix} \phi_{11} & \phi_{12} & \phi_{13} \\ \phi_{21} & \phi_{22} & \phi_{23} \\ \phi_{31} & \phi_{32} & \phi_{33} \end{bmatrix}\begin{bmatrix} x_r \\ x_g \\ x_b \end{bmatrix} + \begin{bmatrix} \phi_{o1} \\ \phi_{o2} \\ \phi_{o3} \end{bmatrix}$$

In Equation 4, CCM denotes the third adjustment function to perform the color correction, and $\varphi_{11}$ through $\varphi_{33}$ and $\varphi_{o1}$ through $\varphi_{o3}$ denote color correction parameters.

$$\Gamma(x; \phi) = \max(x, \epsilon)^{\phi_\gamma} \qquad \text{Equation 5:}$$

In Equation 5, $\Gamma$ denotes the fourth adjustment function to perform the gamma correction, and Wy denotes a gamma adjustment parameter.

$$T(x; \phi) = \phi_s \cdot \max(x, \epsilon)^{\phi_{p1}} - (\phi_s - 1) \cdot \max(x, \epsilon)^{\phi_{p2}} \qquad \text{Equation 6:}$$

In Equation 6, T denotes the fifth adjustment function to perform the tone mapping, and $\varphi_s$, $\varphi_{p1}$, and $\varphi_{p2}$ denote tone mapping parameters.

The decoding model may determine parameters of the adjustment parameter set 402 based on a style vector. The image adjustment model 400 may generate intermediate results 421 through 424 by inputting the parameters of the adjustment parameter set 402 to the adjustment functions 411 through 414 and output the retouch result 431. For example, the adjustment function 411 may correspond to a combination of the first adjustment function and the second adjustment function, the adjustment function 412 may correspond to the third adjustment function, the adjustment function 413 may correspond to the fourth adjustment function, and the adjustment function 414 may correspond to the fifth adjustment function.

At least a portion or all of the image adjustment model 400 may be implemented as a hardware module. For example, at least a portion or all of the ISP pipeline of the image adjustment model 400 may be implemented as a hardware module. The parameters of the adjustment parameter set 402 may be input to the hardware module of the ISP pipeline, and the retouch result 431 may be quickly derived through an acceleration of the hardware module.

Figure 5:
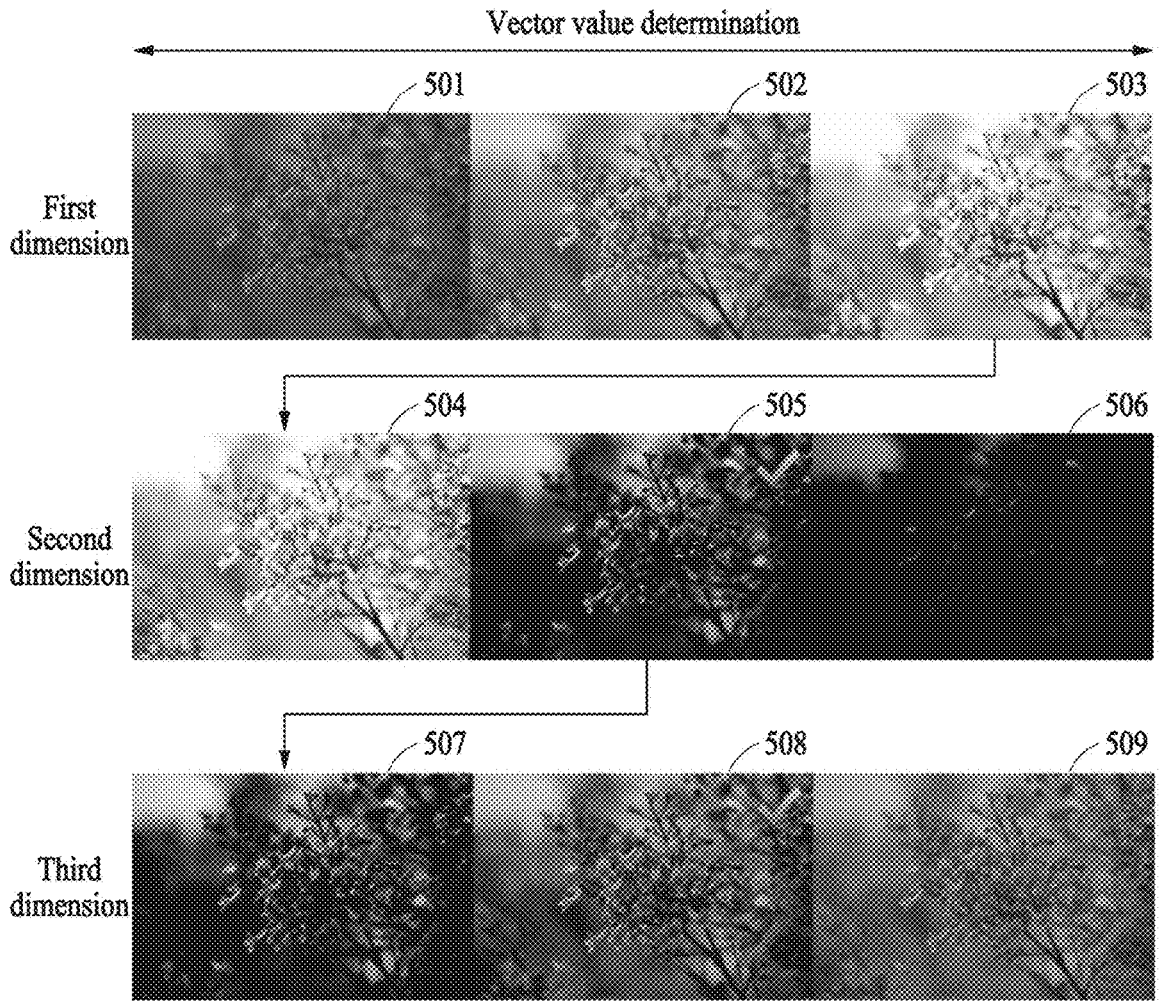
FIG. 5 illustrates an example of retouch results corresponding to vector values of a style vector.

FIG. 5 illustrates an example of retouch results corresponding to vector values of a style vector. A style vector may have a size of an m-dimension and specify a vector value of each dimension of the m-dimension. A user and/or an image processing apparatus may determine the vector value of each dimension of the style vector in sequence or simultaneously, such that a retouch result corresponding to the determined style vector may be generated.

Referring to FIG. 5, the user may identify retouch results 501 through 509 while adjusting a vector value of each dimension of a three-dimensional style vector and determine a user preference associated with the retouch results 501 through 509. For example, the user may identify the retouch results 501 through 503 while changing a vector value of a first dimension of a style vector in a first procedure. The vector value may be changed under a control of the user. The user may adjust the vector value through a user interface. In response to the vector value changing, the retouch results 501 through 503 corresponding to the changed vector value may be provided to the user. For example, the user may change the vector value of the first dimension from a first value used to generate the retouch result 501 to a second value used to generate the retouch result 502, and to a third value used to generate the retouch result 503. The user may select a third retouch result, for example, the retouch result 503, from the retouch results 501 through 503. In response to the third retouch result 503 being selected, the vector value of the first dimension may be determined (e.g., determined as the third value used to generate the retouch result 503).

In response to the vector value of the first dimension being determined, a second procedure may be performed while the vector value of the first dimension is fixed as the determined vector value of the first dimension. The user may identify the retouch results 504 through 506 while changing a vector value of a second dimension in the second procedure and select a fifth retouch result, for example, the retouch result 505 from the retouch results 504 through 506. In response to the fifth retouch result 505 being selected, the vector value of the second dimension may be determined. In response to the vector value of the second dimension being determined, a third procedure may be performed while the vector value of the first dimension and the vector value of the second dimension are fixed. The user may identify the retouch results 507 through 509 while changing a vector value of a third dimension in the third procedure and select an eighth retouch result, for example, the retouch result 508 from the retouch results 507 through 509. In response to the eighth retouch result being selected, the vector value of the third dimension may be determined.

Figure 6:
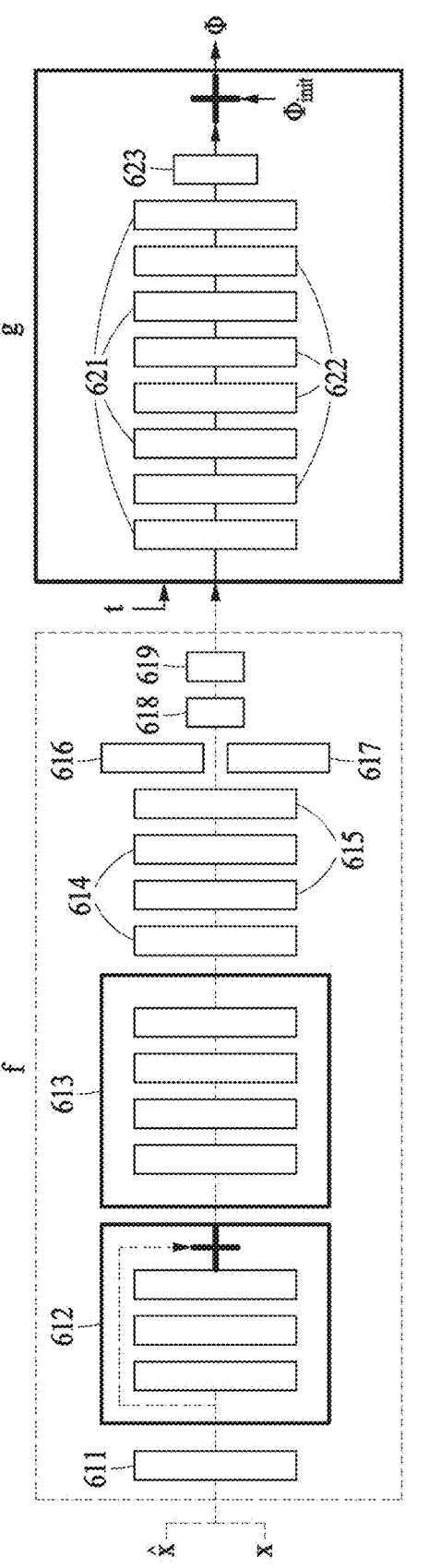
FIG. 6 illustrates an example of an encoder-decoder framework.

FIG. 6 illustrates an example of an encoder-decoder framework. Referring to FIG. 6, an encoding model f may output a style vector t in accordance with an input of an input image x and a retouch image $\tilde{x}$. A decoding model g may output an adjustment parameter set φ in accordance with an input of the style vector t. The encoding model f may be removed when a training process is terminated or completed. The style vector t may be provided by the encoding model f in the training process, and may be provided separately by a user and/or an image processing apparatus in an inference process.

The encoding model f may generate the style vector t corresponding to a relationship between the input image x and the retouch image $\tilde{x}$. The encoding model f may include a convolutional layer 611, residual blocks 612 and 614, reduction blocks 613 and 615, pooling layers 616 and 617, a fully connected layer 618, and an activation function layer 619. The input image x and the retouch image $\tilde{x}$ may be concatenated and then input to the encoding model f. The residual block 612 and the reduction block 613 may include a convolutional operation and an activation function operation, respectively. The convolutional blocks 614 may each have a structure corresponding to that of the residual block 612. The reduction blocks 615 may each have a structure corresponding to that of the reduction block 613.

The decoding model g may generate the adjustment parameter set φ corresponding to the style vector t. The decoding model g may include fully connected layers 621 and 623 and activation function layers 622. To optimize the adjustment parameter set φ, an initial value set $φ_{init}$ may be applied to the adjustment parameter set φ. The structures of the encoding model f and the decoding model g of FIG. 6 are merely an example, and the encoding model f and the decoding model g may have different structures from those shown in FIG. 6. When the adjustment parameter set φ is output by the decoding model g, an image adjustment model may apply the adjustment parameter set φ to the input image x, thereby generating a retouch result. The encoding model f and the decoding model g may be trained such that a difference between the retouch image $\tilde{x}$ and the retouch result is reduced. Through this, a retouch technique applied to the retouch image $\tilde{x}$ may be reflected in the style vector t and the adjustment parameter set q.

When the training of the encoding model f and the decoding model g is completed, a retouch model may be established with the encoding model f removed. The style vector t may be provided by the user and/or the image processing apparatus. A vector value of the style vector t may correspond to a predetermined training technique. For example, the vector value may correspond to a pre-trained retouch technique or a combination of pre-trained retouch techniques. The decoding model g may output the adjustment parameter set φ corresponding to the vector value of the style vector t, such that the adjustment parameter set φ is applied to the input image x and a retouch result is generated. Accordingly, the user may identify retouch results corresponding to various vector values while adjusting the vector value of the style vector t, and select a retouch result corresponding to a preference of the user from the retouch results.

Figure 7:
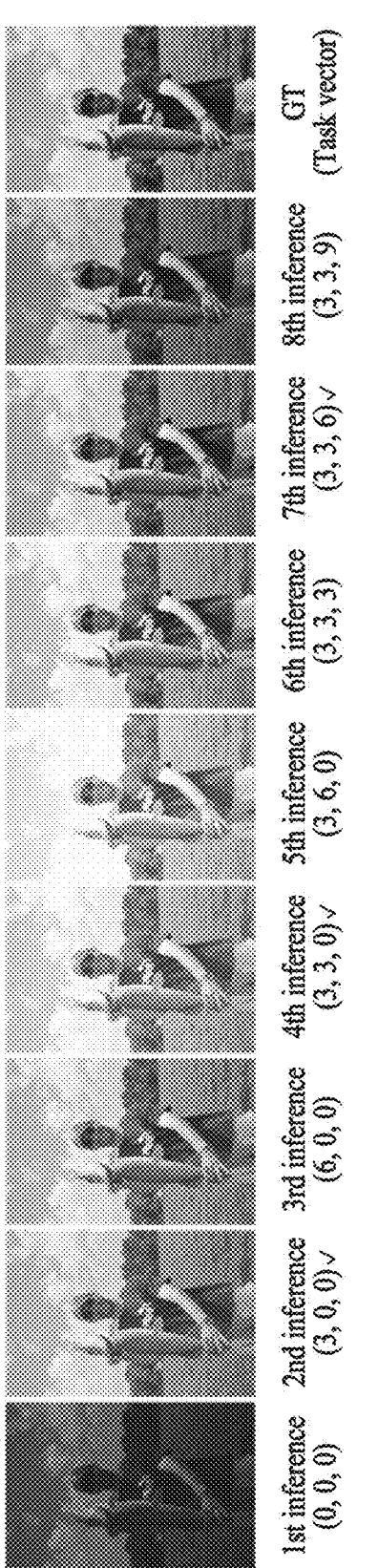
FIGS. 7 and 8 illustrate an example of a process of adjusting vector values of a style vector.
Figure 8:
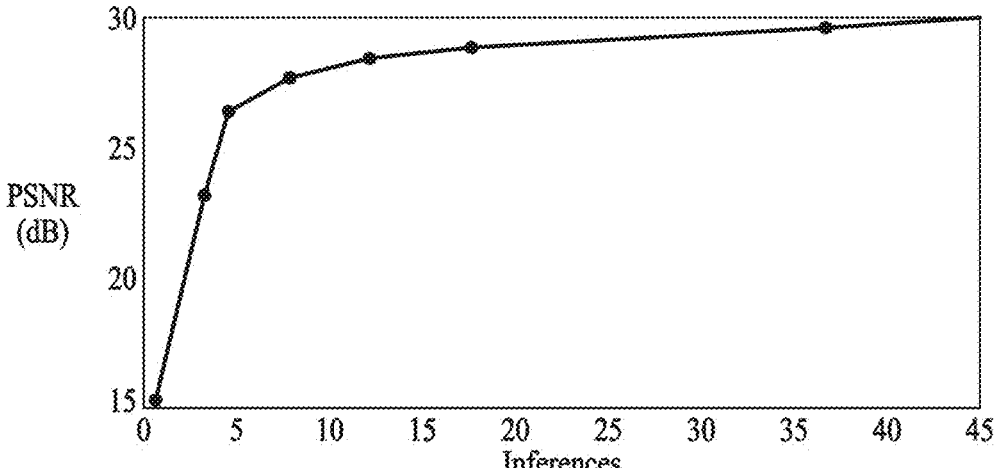

FIGS. 7 and 8 illustrate an example of a process of adjusting vector values of a style vector. FIG. 7 illustrates a retouch result and a vector value of a style vector in each inference stage. The style vector may be expressed as (a, b, c) in which a denotes a vector value of an m1-dimension, b denotes a vector value of an m2-dimension, and c denotes a vector value of an m3-dimension. In the example of FIG. 7, the style vector has a three-dimensional size. However, it is merely an example, and the style vector may have a size of another dimension.

In first through third inference stages, a user may identify retouch results according to a change in value of a and select a retouch result corresponding to a preference of the user. Through this, the value of a may be determined. For example, the value of a may be adjusted to 0, 3, and 6, and determined to be 3 in accordance with a selection of the user. In fourth and fifth inference stages, the user may identify retouch results according to a change in value of b and select a retouch result corresponding to a preference of the user. In sixth through eighth inference stages, the user may identify retouch results according to a change in value of c and select a retouch result corresponding to a preference of the user. For example, the value of b may be selected to be 3, and the value of c may be selected to be 6. A retouch result of the seventh inference stage, which corresponds to a style vector of (3, 3, 6) may be determined to be a final retouch result.

In the example of FIG. 7, it can be seen that the final retouch result is almost identical to a GT image. Referring to FIG. 8, a final retouch result of a high peak signal-to-noise ratio (PSNR) may be derived with relatively few calculations through a simple algorithm such as a greedy search.

Figure 9:
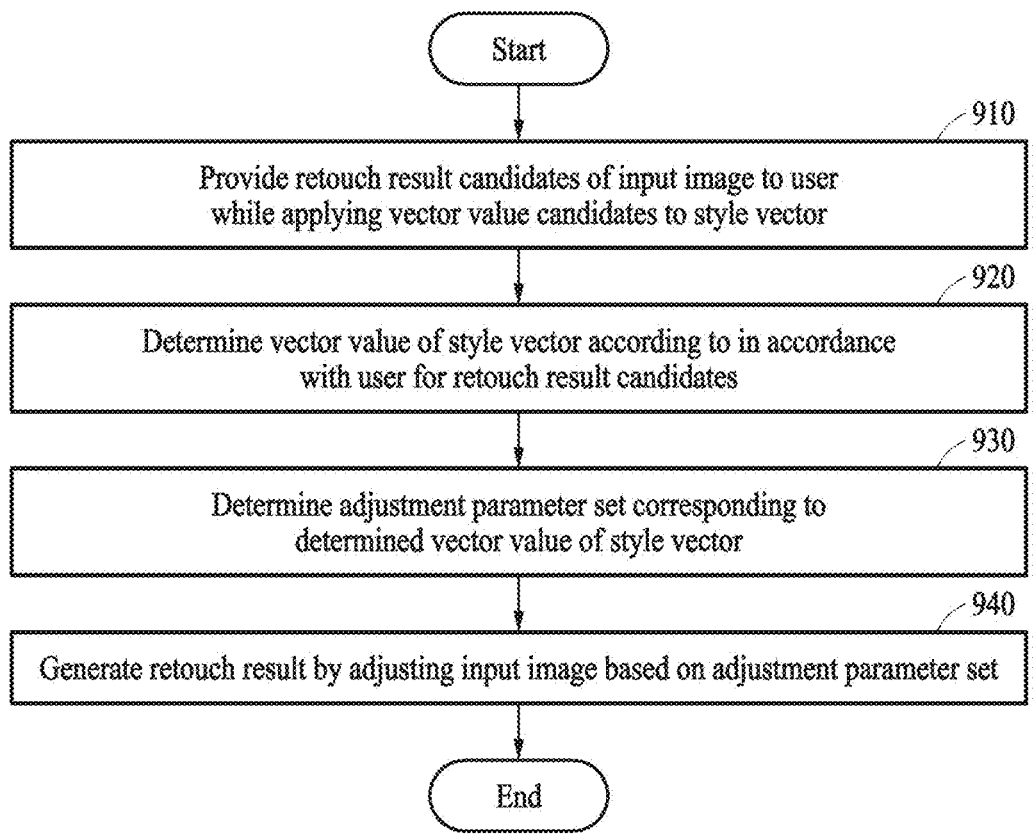
FIG. 9 illustrates an example of an image processing method.

FIG. 9 illustrates an example of an image processing method. Referring to FIG. 9, in operation 910, an image processing apparatus may provide retouch result candidates of an input image to a user while applying vector value candidates to a style vector. In operation 920, the image processing apparatus may determine a vector value of the style vector in accordance with a selection of the user for the retouch result candidates. The style vector may specify a vector value of each dimension of an m-dimension. The m-dimension may be a three-dimension.

Operations 910 and 920 may include an operation of providing first retouch result candidates to the user while changing vector value candidates of an m1-dimension of the m-dimension, an operation of determining a vector value of the m1-dimension of the style vector according to a first selection of the user for the first retouch result candidates, an operation of providing second retouch result candidates to the user while changing vector value candidates of an m2-dimension of the m-dimension, and an operation of determining a vector value of the m2-dimension of the style vector according to a second selection of the user for the second retouch result candidates. In the operation of providing the first retouch result candidates to the user, when changing the vector value candidates of the m1-dimension, vector value candidates of remaining dimensions other than the m1-dimension in the m-dimension may be fixed.

In the operation of providing the first retouch result candidates to the user and the operation of providing the second retouch result candidates to the user, the vector value candidates of the m1-dimension and the vector value candidates of the m2-dimension may be changed under a control of the user. The operation of providing the first retouch result candidates to the user may include an operation of determining a candidate adjustment parameter set corresponding to a vector value candidate of the m1-dimension according to the changing, and an operation of generating a candidate retouch result by adjusting the input image based on the candidate adjustment parameter set.

In operation 930, the image processing apparatus may determine an adjustment parameter set corresponding to the determined vector value of the style vector. Operation 930 may include an operation of determining the adjustment parameter set using a decoding model based on deep learning. The decoding model may be trained through an encoder-decoder framework. The decoding model may be trained through an operation of inputting a sample input image and a sample retouch image to an encoding model based on a neural network, an operation of inputting an output of the encoding model corresponding to a sample style vector to the decoding model, an operation of inputting an output of the decoding model corresponding to a sample adjustment parameter set to an image adjustment model, an operation of acquiring an output of the image adjustment model corresponding to a sample retouch result, and an operation of training the encoding model and the decoding model such that a difference between the sample retouch image and the sample retouch result is reduced. The adjustment parameter set may include parameters that adjust any one or any combination of any two or more of a digital gain, a white balance, a color correction, a gamma correction, tone mapping, denoising, and deblurring.

In operation 940, the image processing apparatus may generate a retouch result by adjusting the input image based on the adjustment parameter set. The operation 940 may include an operation of generating the retouch result by applying the adjustment parameter set to an ISP pipeline set in advance. The ISP pipeline may implement any one or any combination of any two or more of a first adjustment function to adjust a digital gain, a second adjustment function to adjust a white balance, a third adjustment function to perform a color correction, a fourth adjustment function to perform a gamma correction, a fifth adjustment function to perform tone mapping, a sixth adjustment function to perform denoising, and a seventh adjustment function to perform deblurring. The adjustment parameter set may include input values of any one or any combination of any two or more of the first adjustment function, the second adjustment function, the third adjustment function, the fourth adjustment function, the fifth adjustment function, the sixth adjustment function, and the seventh adjustment function.

In operation 910, when data generated in association with the retouch result exists, the image processing apparatus may use the data in operations 920 through 940. For example, in operation 910, when there is a retouch result generated in advance, the image processing apparatus may provide the generated retouch result to the user instead of performing an operation for generating the retouch result again in operations 920 through 940. The description of FIGS. 1 through 8, 10, and 11 may apply to the image processing method.

Figure 10:
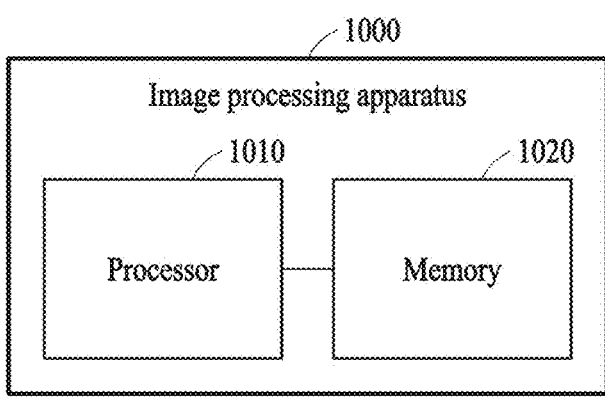
FIG. 10 illustrates an example of an image processing apparatus.

FIG. 10 illustrates an example of an image processing apparatus. Referring to FIG. 10, an image processing apparatus 1000 includes a processor 1010 (e.g., one or more processors) and a memory 1020 (e.g., one or more memories). The memory 1020 may be connected to the processor 1010 and store instructions to be executed by the processor 1010, data to be computed by the processor 1010, or data that has been processed by the processor 1010. The memory 1020 may include a non-transitory computer-readable medium, for example, a high-speed random-access memory and/or a non-volatile computer-readable storage media (e.g., one or more disk storage devices, flash memory devices, or other non-volatile solid state memory devices).

The processor 1010 may execute instructions to perform any one, any combination of any two or more, or all of the operations and methods of FIGS. 1 through 9 and 11. For example, the processor 1010 may provide retouch result candidates of an input image to a user while applying vector value candidates to a style vector, determine a vector value of the style vector in accordance with a selection of the user for the retouch result candidates, determine an adjustment parameter set corresponding to the determined vector value of the style vector, and generate a retouch result by adjusting the input image based on the adjustment parameter set. In addition, the description of FIGS. 1 through 9, and 11 may apply to the image processing apparatus 1000.

Figure 11:
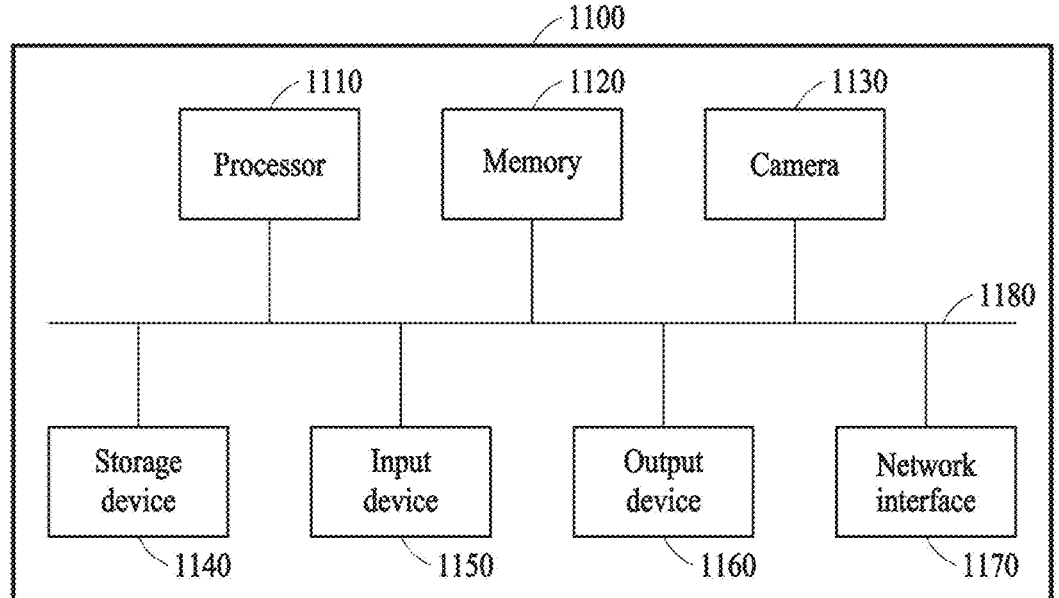
FIG. 11 illustrates an example of an electronic apparatus.

FIG. 11 illustrates an example of an electronic apparatus. Referring to FIG. 11, an electronic apparatus 1100 includes a processor 1110 (e.g., one or more processors), a memory 1120 (e.g., one or more memories), a camera 1130, a storage device 1140, an input device 1150, an output device 1160, and a network interface 1170. The processor 1110, the memory 1120, the camera 1130, the storage device 1140, the input device 1150, the output device 1160, and the network interface 1170 may communicate through a communication bus 1180. For example, the electronic apparatus 1100 may be implemented as a portion of a mobile device such as a mobile phone, a smartphone, a PDA, a netbook, a tablet computer, and a laptop computer, a wearable device such as a smart watch, a smart band, and smart glasses, a computing device such as a desktop and a server, home appliances such as a television (TV) a smart TV, and a refrigerator, a security device such as a door lock, or a vehicle such as a smart car. The electronic apparatus 1100 may include the image processing apparatus 1000 of FIG. 10 as a structural and/or functional part.

The processor 1110 executes functions and instructions for execution in the electronic apparatus 1100. For example, the processor 1110 may process instructions stored in the memory 1120 or the storage device 1140. The processor 1110 may perform any one, any combination of any two or more, or all of the operations and methods described with reference to FIGS. 1 through 10. The memory 1120 may include a computer-readable storage medium or a computer-readable storage device. The memory 1120 may store instructions to be executed by the processor 1110 and store relevant information while software and/or an application is executed by the electronic apparatus 1100.

The camera 1130 may generate an input image. The input image may include an image and/or a video. The storage device 1140 includes a computer-readable storage medium or a computer-readable storage device. The storage device 1140 may store a larger quantity of information compared to the memory 1120 and store information for a long time. The storage device 1140 may include, for example, a magnetic hard disk, an optical disk, a flash memory, a floppy disk, or other types of non-volatile memories known in the art.

The input device 1150 may receive an input from a user based on a traditional input method using a keyboard and a mouse and a new input method such as a touch input, a voice input, and an image input. For example, the input device 1150 may include any device that detects an input from a keyboard, a mouse, a touch screen, a microphone, or a user and transfers the detected input to the electronic apparatus 1100. The output device 1160 may provide an output of the electronic apparatus 1100 to a user through a visual, auditory, or tactile channel. The output device 1160 may include, for example, a display, a touch screen, a speaker, a vibration generating device, or any device for providing an output to a user. The network interface 1170 may communicate with an external device through a wired or wired network.

The image processing apparatuses, processors, memories, electronic apparatuses, cameras, storage devices, input devices, output devices, network interfaces, communication buses, image processing apparatus 1000, processor 1010, memory 1020, electronic apparatus 1100, processor 1110, memory 1120, camera 1130, storage device 1140, input device 1150, output device 1160, network interface 1170, communication bus 1180, and other apparatuses, units, modules, devices, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with image processing, the method comprising:

providing retouch result candidates of an input image to a user in response to applying vector value candidates to a single style vector comprising m-dimensions of style, where m is at least two, wherein the style vector specifies a vector value of each dimension of m-dimensions;

determining vector values of the style vector by adjusting the m-dimensions of the style vector based on user selections of the retouch result candidates;

generating an adjustment parameter set corresponding to the determined vector values of the style vector; and generating a retouch result by adjusting the input image based on the adjustment parameter set, wherein the providing of the retouch result candidates of the input image to the user and the determining of the vector values of the style vector is based on the selection of the user comprises:

providing first retouch result candidates to the user in response to changing vector value candidates of an m1-dimension of the m-dimensions;

determining a vector value of the m1-dimension of the style vector based on a first selection of the user for the first retouch result candidates;

providing second retouch result candidates to the user in response to changing vector value candidates of an m2-dimension of the m-dimensions; and determining a vector value of the m2-dimension of the style vector based on a second selection of the user for the second retouch result candidates, wherein, in the providing of the first retouch result candidates to the user in response to changing the vector value candidates of the m1-dimension, vector value candidates of remaining dimensions other than the m1-dimension in the m-dimensions are fixed, and wherein, in the providing of the second retouch result candidates to the user in response to changing the vector value candidates of the m2-dimension, the determined vector value of the m1-dimension are fixed.

2. The method of claim 1, wherein the m-dimensions is three-dimensions.

3. The method of claim 1, wherein, in the providing of the first retouch result candidates to the user and the providing of the second retouch result candidates to the user, the vector value candidates of the m1-dimension and the vector value candidates of the m2-dimension are changed under a control of the user.

4. The method of claim 1, wherein the providing of the first retouch result candidates to the user comprises:

determining a candidate adjustment parameter set corresponding to a vector value candidate of the m1-dimension based on the changing; and generating a candidate retouch result by adjusting the input image based on the candidate adjustment parameter set.

5. The method of claim 1, wherein the determining of the adjustment parameter set comprises determining the adjustment parameter set using a decoding model based on deep learning.

6. The method of claim 5, wherein the decoding model is trained through an encoder-decoder framework.

7. The method of claim 5, wherein the decoding model is trained through operations of:

inputting a sample input image and a sample retouch image to an encoding model based on a neural network;

inputting an output of the encoding model corresponding to a sample style vector to the decoding model;

inputting an output of the decoding model corresponding to a sample adjustment parameter set to an image adjustment model;

acquiring an output of the image adjustment model corresponding to a sample retouch result; and training the encoding model and the decoding model such that a difference between the sample retouch image and the sample retouch result is reduced.

8. The method of claim 1, wherein the adjustment parameter set comprises a parameter that adjusts any one or any combination of any two or more of a digital gain, a white balance, a color correction, a gamma correction, tone mapping, denoising, and deblurring.

9. The method of claim 1, wherein the generating of the retouch result comprises generating the retouch result by applying the adjustment parameter set to an image signal processing (ISP) pipeline set in advance.

10. The method of claim 9, wherein the ISP pipeline implements any one or any combination of any two or more of:

a first adjustment function to adjust a digital gain;

a second adjustment function to adjust a white balance;

a third adjustment function to perform a color correction;

a fourth adjustment function to perform a gamma correction;

a fifth adjustment function to perform tone mapping;

a sixth adjustment function to perform denoising; and a seventh adjustment function to perform deblurring.

11. The method of claim 10, wherein the adjustment parameter set comprises an input value of any one or any combination of any two or more of the first adjustment function, the second adjustment function, the third adjustment function, the fourth adjustment function, the fifth adjustment function, the sixth adjustment function, and the seventh adjustment function.

12. A non-transitory computer-readable storage medium storing instructions that, when executed by one or more processors, configure the one or more processors to perform the method of claim 1.

13. The method of claim 1, wherein the determining of the vector values of the style vector comprises:

determining a vector value of a first dimension of the m-dimensions of the style vector;

setting the vector value of the first dimension; and providing, while maintaining the set vector value of the first dimension, additional retouch result candidates by adjusting a vector value for a second dimension of the style vector.

14. The method of claim 1, wherein each user selection of a retouch result candidate determines a vector value for a respective dimension of the style vector, and wherein new retouch result candidates are generated after each user selection using the determined vector value.

15. An apparatus with image processing, the apparatus comprising:

one or more processors configured to:

provide retouch result candidates of an input image to a user in response to applying vector value candidates to a single style vector comprising m-dimensions of style, where m is at least two, wherein the style vector specifies a vector value of each dimension of m-dimensions;

determine vector values of the style vector by adjusting the m-dimensions of the style vector based on user selections of the retouch result candidates;

generating an adjustment parameter set corresponding to the determined vector values of the style vector; and generate a retouch result by adjusting the input image based on the adjustment parameter set, wherein, for the providing of the retouch result candidates and the determining of the vector values, the one or more processors are configured to:

provide first retouch result candidates to the user in response to changing vector value candidates of an m1-dimension of the m-dimensions;

determine a vector value of the m1-dimension of the style vector based on a first selection of the user for the first retouch result candidates;

provide second retouch result candidates to the user in response to changing vector value candidates of an m2-dimension of the m-dimensions; and determine a vector value of the m2-dimension of the style vector based on a second selection of the user for the second retouch result candidates, wherein, in the providing of the first retouch result candidates to the user in response to changing the vector value candidates of the m1-dimension, vector value candidates of remaining dimensions other than the m1-dimension in the m-dimensions are fixed, and wherein, in the providing of the second retouch result candidates to the user in response to changing the vector value candidates of the m2-dimension, the determined vector value of the m1-dimension are fixed.

16. The apparatus of claim 15, wherein, in the providing of the first retouch result candidates to the user and the providing of the second retouch result candidates to the user, the vector value candidates of the m1-dimension and the vector value candidates of the m2-dimension are changed under a control of the user.

17. The apparatus of claim 15, further comprising a memory storing instructions that, when executed by the one or more processors, configure the one or more processors to perform the providing of the retouch result candidates, the determining of the vector value, the generating of the adjustment parameter set, and the generating of the retouch result.

18. The apparatus of claim 15, wherein each user selection of a retouch result candidate determines a vector value for a respective dimension of the style vector, and wherein new retouch result candidates are generated after each user selection using the determined vector value.

19. An electronic apparatus comprising:

a camera configured to generate an input image; and one or more processors configured to:

provide retouch result candidates of the input image to a user in response to applying vector value candidates to a single style vector comprising m-dimensions of style, where m is at least two, wherein the style vector specifies a vector value of each dimension of m-dimensions;

determine vector values of the style vector by adjusting the m-dimensions of the style vector based on user selection of the retouch result candidates;

generate an adjustment parameter set corresponding to the determined vector values of the style vector; and generate a retouch result by adjusting the input image based on the adjustment parameter set, wherein, for the providing of the retouch result candidates and the determining of the vector values, the one or more processors are configured to:

provide first retouch result candidates to the user in response to changing vector value candidates of an m1-dimension of the m-dimensions;

determine a vector value of the m1-dimension of the style vector based on a first selection of the user for the first retouch result candidates;

provide second retouch result candidates to the user in response to changing vector value candidates of an m2-dimension of the m-dimensions; and determine a vector value of the m2-dimension of the style vector based on a second selection of the user for the second retouch result candidates, wherein, in the providing of the first retouch result candidates to the user in response to changing the vector value candidates of the m1-dimension, vector value candidates of remaining dimensions other than the m1-dimension in the m-dimensions are fixed, and wherein, in the providing of the second retouch result candidates to the user in response to changing the vector value candidates of the m2-dimension, the determined vector value of the m1-dimension are fixed.

20. The apparatus of claim 19, wherein the determining of the vector values of the style vector comprises:

setting the vector value of the first dimension; and providing, while maintaining the set vector value of the first dimension, additional retouch result candidates by adjusting a vector value for a second dimension of the style vector.

21. The apparatus of claim 19, wherein each user selection of a retouch result candidate determines a vector value for a respective dimension of the style vector, and wherein new retouch result candidates are generated after each user selection using the determined vector value.

22. A processor-implemented method with image processing, the method comprising:

generating retouch result candidates of an input image in response to applying vector value candidates to a single style vector comprising m-dimensions of style, where m is at least two, where the style vector specifies a vector value of each dimensions of m-dimensions;

determining vector values of the style vector based on the retouch result candidates;

determining an adjustment parameter set corresponding to the determined vector values of the style vector; and generating a retouch result by adjusting the input image based on the adjustment parameter set, wherein the generating of the retouch result candidates and the determining of the vector values comprises:

generating a first retouch result candidate in response to generating a vector value candidate of a first dimension; and determining a vector value of the first dimension of the style vector based on the first retouch result candidate, wherein, in the generating of the first retouch result candidates in response to generating the vector value candidate of the first dimension, vector value candidates of remaining dimensions other than the first dimension in the m-dimensions are fixed.

23. The method of claim 22, wherein the determining of the vector values of the style vector comprises:

setting the vector value of the first dimension; and providing, while maintaining the set vector value of the first dimension, additional retouch result candidates by adjusting a vector value for a second dimension of the style vector.

24. The method of claim 22, wherein each user selection of a retouch result candidate determines a vector value for a respective dimension of the style vector, and wherein new retouch result candidates are generated after each user selection using the determined vector value.

* * * * *